United States Patent Office 3,649,606
Patented Mar. 14, 1972

3,649,606
PROCESS FOR REDUCING EQUIPMENT FOULING IN THE MANUFACTURE OF BUTADIENE HOMOPOLYMER
Lloyd M. Watson, Cincinnati, Ohio, and Leo H. Broering, Fort Wright, Ky., assignors to National Distillers and Chemical Corporation, New York, N.Y.
No Drawing. Filed Aug. 31, 1967, Ser. No. 664,638
Int. Cl. C08d 1/32, 3/06; C08f 1/28
U.S. Cl. 260—82.1                                    7 Claims

ABSTRACT OF THE DISCLOSURE

In the polymerization of butadiene to butadiene homopolymer a high molecular weight gel-like polybutadiene is produced which fouls the equipment. The instant invention provides a process for reducing if not substantially eliminating the build-up of this gel-like material on the equipment by incorporating in the polymerization reaction mixture from about 1 to about 5% by weight isoprene or styrene. This improved process is especially applicable to the polymerization of butadiene with alfin catalysts.

---

This invention relates to a process for the production of butadiene homopolymer and more particularly, to an improved process for the preparation of butadiene homopolymer wherein fouling of equipment by high molecular weight polybutadiene gum is substantially reduced if not eliminated by incorporating in the polymerization reaction mixture less than 5% isoprene or styrene.

It has been found that during the polymerization of butadiene using conventional equipment, such as a reaction vessel equipped with an agitator, a build-up of a gel-like material occurs in the reactor, on the agitator shaft and blades, and in the lines connected to the reactor. The gel-like material has been found to be a substantially insoluble, high molecular weight butadiene homopolymer gum. This build-up fouls the polymerization apparatus and necessitates the shutdown of the system from time to time, in order to remove the gel. This, of course, results in reduced efficiency in the manufacture of the butadiene homopolymer. The problem is especially critical in the manufacture of butadiene homopolymer employing alfin catalysts, which are composed of a sodium alkoxide, a sodium alkenyl compound, and an alkali metal halide, even when molecular weight modifiers are employed as described in U.S. Pats. Nos. 3,067,187, issued Dec. 4, 1962 and 3,223,691, issued Dec. 14, 1965 to Greenberg et al.

It has now been found that fouling of reactors and associated apparatus with polybutadiene gel can be very much reduced, and in many cases substantially eliminated, by carrying out the polymerization of butadiene in the presence of an amount of isoprene or styrene within the range from about 1 to about 5% by weight of the butadiene. The resulting product is essentially butadiene homopolymer, and has substantially the properties of butadiene homopolymer. The amounts of isoprene or styrene added to the butadiene are so small as to have substantially no noticeable effect on the polybutadiene. Accordingly, the resulting product can be characterized as and is butadiene homopolymer.

The isoprene or styrene should be employed in an amount within the range from about 1 to about 5% by weight of the butadiene, preferably in an amount within the range from about 2 to about 5% by weight. Amounts greater than 5% by weight isoprene or styrene are not needed, and may introduce undesirable copolymer properties to the butadiene homopolymer.

The invention is generally applicable to the production of butadiene homopolymer by conventional processes, such as by emulsion polymerization of 1,3-butadiene or by alkali metal-catalyzed polymerization of 1,3-butadiene, for example, using a sodium catalyst to produce mixtures of butadiene homopolymer having 1,2-addition, cis-1,4-addition and trans-1,4-addition structures. In addition, the instant invention is applicable to the production of butadiene homopolymer, consisting of from 90 to 95% cis-1,4 structure by the stereoregular polymerization of butadiene employing as a catalyst combinations of alkylaluminum or alkyllithium with selected titanium compounds, for example, alkylaluminum with titanium tetraiodide, or butyllithium with titanium trichloride, in octane solution. A cobalt chloride catalyst could also be used. However, the invention is particularly applicable to the production of butadiene homopolymer employing alfin catalysts, such as, for example, the processes as described in U.S. Pats. Nos. 3,067,187, issued Dec. 4, 1962, and 3,223,691, issued Dec. 14, 1965, to Greenberg et al. The alfin catalyst is described in the articles by Morton, J. Am. Chem. Soc. 69 161; 167; 950; 1675; and 2224 (1947). The name "alfin" is taken from the use of an alcohol and an olefin in their preparation. The alcohol, a methyl-n-alkyl carbinol in the form of the sodium salt, and the olefin, also in the form of a sodium salt, and the alkali metal salt form a complex that constitutes the catalyst. As indicated hereinbefore, the alfin catalyst can comprise a sodium alkoxide, a sodium alkenyl compound and an alkali metal salt, such as, for example, a mixture of sodium isopropoxide, allyl sodium, and sodium chloride. The catalyst is usually prepared by reacting amyl chloride with sodium, and subsequently reacting this product with a methyl-n-alkyl carbinol and an olefin. In an illustrative example, the alfin catalyst is prepared by reacting 2 moles of amyl chloride an 4 equivalents of sodium in pentane or hexane, with high speed stirring. One mole of the resulting amyl sodium is then reacted with 1 mole of isopropyl alcohol, and 1 mole of the amyl sodium is reacted with 1 mole of propylene, to give a mixture containing sodium isopropoxide, allyl sodium, and sodium chloride. These steps are effected at about −15° C. in order to prevent side reactions.

A catalyst of satisfactory activity also can be obtained by inverting the order of reaction of the components, and substituting n-butyl chloride for n-amyl chloride. In this method, isopropoxide is formed by direct reaction with sodium, instead of with alkyl sodium, with a saving of one-half of the alkyl halide and one quarter of the sodium. Such a catalyst can be prepared at ambient temperatures, up to and including the boiling point of hexane.

In the preparation of alfin catalyzed polymers of controlled molecular weight, certain dihydro derivatives of aromatic hydrocarbons, as taught in the Greenberg et al. patents referred to above, are present in the reaction mixture. Such final products have a high elastomer content, but low intrinsic viscosity. The dihydroaromatic hydrocarbons that are useful include 1,4-dihydrobenzene, 1,4-dihydronaphthalene, 1,2-dihydrobenzene, 1,2-dihydrotoluene, dihydro-xylene and mixtures of these: 1,4-dihydronaphthalene is preferred.

It is generally preferable to prepare an alfin rubber having a molecular weight within the range from about 200,000 to about 750,000. Polymers having molecular weights below about 200,000 generally are soft, and do not have a desirable toughness, while polymers having molecular weights above about 750,000 are too hard, and are not satisfactorily processable using conventional equipment. Such polymers can be obtained using from 0.1 to about 80% by weight of the molecular weight modifier, based on the weight of the monomer. The use of about 0.2 to about 1% dihydronaphthalene is preferred.

The polymerization of butadiene with the small amounts of isoprene or styrene in accordance with the invention can be conducted in a batchwise, semi-continuous or continuous manner, depending upon the equipment that is available. The butadiene and isoprene or styrene and alfin or other catalyst, and solvent, normally are blended together in a reactor in the desired proportions appropriate for the polymer being produced. If the reaction is to be effected under anhydrous conditions, as is necessary in the case of certain catalyets, such as the alfin catalysts, the reactor should be dry, and air should be excluded. Normally, the butadiene and isoprene or styrene and solvent are mixed together first, and then the catalyst is added. The reaction mixture is brought to the reaction temperature, preferably with agitation, and the reaction is then permitted to proceed.

The polymerization of the butadiene is conducted in the presence of a hydrocarbon solvent or diluent, which will be inert under the reaction conditions, and should not poison the catalyst. The solvent should be volatile at normal atmospheric pressures and at a reasonably low temperature, for example, below about 250° F., in order to facilitate flashing or removal of the solvent from the reaction product. The butadiene and isoprene or styrene should preferably be soluble in the solvent that is used.

Suitable solvents for alfin polymerizations and polymerizations in the presence of sodium are cycloaliphatic hydrocarbons, such as cyclopentane, cyclohexane, methylcyclopentane, methylcyclohexane, and cyclooctane, and open chain paraffinic hydrocarbons having from 3 to about 12 carbon atoms, such as n-hexane, n-pentane, isoheptane, isooctane (2,2,4 - trimethylpentane), butane, nonane, decane and dodecane. The petroleum ethers are very satisfactory solvents. For other polymerizations, aromatic hydrocarbons such as benzene, toluene, o-, m-, and p-xylene, mesitylene, and p-cumene, and halogenated hydrocarbons can be used, such as monochlorobenzene, p-dichlorobenzene, 2,4,6 - trichlorotoluene, tetrachloroethane, and perchloroethylene.

The concentration of monomer in the reaction mixture should be such that the polymer concentration is within the range from about 5 to about 30%, and in a continuous process a concentration of from 5 to 15% is preferred.

The reaction temperature can range from as low as −15° C. up to about 150° C. or higher, depending upon the polymerization technique employed. Alfin rubbers are formed very quickly at elevated temperatures, and consequently, low reaction temperatures are usually employed, in order to maintain good control over the reaction. There is, of course, no criticality in the reaction temperature, and the reaction temperatures that are employed for preparing butadiene homopolymer will depend upon the catalyst system used. For example, where an alkali metal catalyst is employed, the reaction temperature can be within the range from about 10° to 100° C. Where an alfin catalyst is employed, the reaction temperature will range from −30° C. up to about 125° C. Where an organolithium catalyst is employed to obtain the cis-1,4 structure, the reaction temperature should be within the range from about −50° to about 250° C., usually from 0 to about 80° C. Where alkylaluminum with selected titanium compounds, or cobalt chloride alone, are employed as catalysts for the polymerization to the cis-1,4 structure, the reaction temperature should be within the range from about 0 to about 50° C.

The pressure that is employed is sufficient to maintain the solvent in the liquid phase, so that a liquid phase reaction can be carried out. In general, the reaction pressure can range from atmospheric pressure or slightly below, up to 500 p.s.i. and more, and is in no way critical.

The reaction can be carried out in conventional polymerization reactors, equipped with agitators, such as, for example, a Pfaudler reactor. A reactor of the type used in the rubber field known as a scraped surface reactor can also be used, such as a Crawford and Russell reactor. The reaction can be carried out batchwise or continuously, using such reactors. However, the reactors are run liquid-full.

The catalyst can be soluble in the reaction mixture. If it is not, in many cases it is found preferable to suspend the catalyst in particulate form in the reaction mixture, forming a dispersion or slurry. In this event, it is necessary to agitate or stir the reaction mixture during the reaction, and it is also necessary either to deactivate the catalyst or to remove the catalyst from the reaction mixture upon completion of the reaction, or both.

After polymerization has proceeded to the desired extent, it is usually convenient to add a catalyst deactivator to the reaction mixture. If the polymer is soluble in the solvent, then any suspended solid materials, such as catalyst, can be removed by filtration or centrifuging. At the same time, or shortly thereafter, it is also customary to add various adjuncts to the reaction mixture, such as antioxidants and other types of heat and light stabilizers for the polymer, to prevent degradation of the polymer during subsequent processing.

In the case of alfin catalysts, the catalyst is insoluble in the polymer solution. Therefore, it can be removed, or, alternatively, it can be left in, and a catalyst deactivator added instead. Typical deactivators for alfin catalysts are water, aliphatic alcohols, such as ethanol, propanol, isobutanol, and pentanol, methylcellosolve, glycols, such as ethylene glycol, and higher polyols, such as glycerol and pentaerythritol.

The following examples in the opinion of the inventors represent preferred embodiments of their invention.

EXAMPLE 1

A butadiene homopolymer substantially gel-free was prepared continuously over a five day week employing the following procedure:

Butadiene and styrene, as a 10% solution in Isopar C, which comprises 100% isoparaffins, largely isooctane, were fed into a polymerization reactor equipped with an agitator to provide a weight ratio of butadiene:styrene within the range from about 94.8:5.2 to about 94.4:5.6. The reactor was run liquid full.

An alfin catalyst was prepared by charging 1808 lb. of Isopar C into a 500 gal. reactor provided with a stirrer, Dry Ice, reflux condenser, and a water-cooling bath. To this was added six incremental amounts of a 26% sodium dispersion containing 114 lb. of finely divided sodium, dispersed in 324 lb. of Isopar E. Isopar E has the following composition.

| Component: | Wt. percent |
|---|---|
| 2,2,4-trimethylpentane | 2.2 |
| 2,5-dimethylhexane }<br>2,4-dimethylhexane } | 4.8 |
| 2,3,4-trimethylpentane | 11.5 |
| 2,3,3-trimethylpentane | 21.1 |
| 3-methylheptane | 33.0 |
| 2,2,4-trimethylhexane | 6.2 |
| 3-methyl-4-ethylhexane }<br>3,4-dimethylheptane }<br>2,3-dimethylheptane }<br>3,3,4-trimethylhexane } | 5.7 |
| 15 other iso-components | 13.7 |
| $C_9$ naphtha+$C_{10+}$ | 1.8 |
| | 100.0 |

Isopropyl alcohol (100 lb.) was added to this mixture over a period of two hours, and permitted to react for 2.33 hours at temperatures ranging from 116 to 140° F. n-Butylchloride (155 lb.) was then added over a period of 3.83 hours and the mixture was stirred for 11.5 hours at a temperature ranging from 100 to 126° F. Propylene (81 lb. representing a 15.4% excess) was subsequently introduced into the mixture over a period of 1.83 hours. The average pressure during the propylene addition was 14 p.s.i.g. The ingredients were permitted to react for 24 hours at temperatures ranging from 95 to 104° F.

The alfin catalyst comprising 0.4 mole sodium iopropoxide, 0.4 mole allyl sodium and 0.4 mole sodium chloride together with 1,4-dihydronaphthalene were added to the above mixture. The system was under an average pressure of about 2 p.s.i.g., and maintained at an average temperature of about 135° F. with moderate agitation. As the butadiene homopolymer is formed, the polymer is withdrawn continuously from the system.

Table I below sets out the pertinent data relating to each of days 1 to 5 and includes, among other data, amounts fed and feed rates of butadiene, styrene, catalyst, 1,4-dihydronaphthalene and solvent, ratio of butadiene to styrene, and ratios of each of catalyst, and 1,4-dihydronaphthalene to total monomer fed.

was insufficient accumulation of this gel-like material to be troublesome. There was no build-up on the agitator shaft and blades. The polymer obtained had substantially the same properties as butadiene homopolymer. The small amount of styrene present had no significant effect.

As a control, the aforementioned procedure for preparing butadiene homopolymer was repeated with the exception that no styrene was polymerized with the butadiene gas. Table II below sets out data for a one week continuous operation as in Example 1, including amounts and feed rates of butadiene, catalyst, solvent and 1,4-dihydronaphthalene.

At the end of each of the five days, the examination

TABLE II

| | Starting materials at— | | | | | Total for week |
|---|---|---|---|---|---|---|
| | Day 1 | Day 2 | Day 3 | Day 4 | Day 5 | |
| | Operating time (hours) | | | | | |
| | 23.5 | 23.00 | 21.83 | 24.00 | 14.0 | 106.33 |
| Catalyst: | | | | | | |
| Pounds alfin catalyst fed | 166.52 | 115.32 | 127.09 | 127.09 | 75.18 | 611.20 |
| Average feed rate, pound/hr | 7.09 | 5.01 | 5.82 | 5.30 | 5.37 | 5.75 |
| Pounds catalyst/pound monomer | 0.4589 | 0.3230 | 0.3599 | 0.3266 | 0.3412 | 0.3633 |
| Monomers: | | | | | | |
| Pound butadiene fed | 362.84 | 357.04 | 353.10 | 389.08 | 220.37 | 1,682.43 |
| Average feed rate, pound/hr | 15.44 | 15.52 | 16.17 | 16.21 | 15.74 | 15.82 |
| Total monomer fed, pound | 362.84 | 357.04 | 353.10 | 389.08 | 220.37 | 1,682.43 |
| Average monomer feed rate, pound/hr | 15.44 | 15.52 | 16.17 | 16.21 | 15.74 | 15.82 |
| Molecular weight moderator: | | | | | | |
| Pound 1,4-dihydronaphthalene fed | 2.5193 | 2.2412 | 2.5667 | 2.7122 | 1.5017 | 11.7211 |
| Average feed rate, pound/hr | 0.1072 | 0.1053 | 0.1176 | 0.1130 | 0.1073 | 0.1102 |
| Pound 1,4-dihydronaphthalene/pound monomer | 0.00694 | 0.00678 | 0.00726 | 0.00697 | 0.00681 | 0.00696 |
| Solvent: | | | | | | |
| Pound Isopar C fed | 3,435.50 | 3,251.32 | 3,298.07 | 3,505.75 | 2,109.49 | 15,600.13 |
| Average feed rate, pound/hr | 146.19 | 141.36 | 151.08 | 146.07 | 150.68 | 146.71 |
| Total feed to reactors, pound | 3,848.32 | 3,643.65 | 3,689.96 | 3,933.76 | 2,352.79 | 17,468.48 |
| Monomer feed, percent of total | 9.43 | 9.80 | 9.57 | 9.89 | 9.37 | 9.63 | was conducted as before, and build-up of gel-like material was observed on the first day, especially in the transport lines. At the end of the five day period, the reactor was completely drained as before, and gel-like material was observed throughout the reactor, in the overflow and transfer lines, and on the agitator shaft and blades.

TABLE I

| | Starting materials at— | | | | | Total for week |
|---|---|---|---|---|---|---|
| | Day 1 | Day 2 | Day 3 | Day 4 | Day 5 | |
| | Operating time (hours) | | | | | |
| | 23.00 | 18.75 | 24.00 | 23.00 | 8.0 | 96.75 |
| Catalyst: | | | | | | |
| Pounds alfin catalyst fed | 138.00 | 122.11 | 126.70 | 108.60 | 54.30 | 549.71 |
| Average feed rate, pounds/hr | 6.00 | 6.46 | 5.28 | 4.72 | 6.79 | 5.68 |
| Pound catalyst/pound monomer | 0.4229 | 0.4258 | 0.3569 | 0.3246 | 0.4610 | 0.3870 |
| Momomers: | | | | | | |
| Pounds butadiene fed | 307.70 | 271.87 | 336.37 | 315.65 | 111.17 | 1,342.76 |
| Average feed rate, pounds/hr | 13.37 | 14.50 | 14.02 | 13.72 | 13.90 | 13.88 |
| Pounds styrene fed | 18.59 | 14.93 | 18.59 | 18.92 | 6.63 | 77.66 |
| Average feed rate, pound/hr | 0.81 | 0.80 | 0.77 | 0.82 | 0.83 | 0.80 |
| Total monomer fed, pounds | 326.29 | 286.80 | 354.96 | 334.57 | 117.80 | 1,420.42 |
| Average monomer feed rate, pounds/hr | 14.18 | 15.30 | 14.79 | 14.54 | 14.73 | 14.68 |
| Butadiene-styrene ratio | 94.3/5.7 | 94.8/5.2 | 94.8/5.2 | 94.4/5.6 | 94.4/5.6 | [1] 94.5/5.5 |
| Molecular weight moderator: | | | | | | |
| Pounds 1,4-dihydronaphthalene fed | 2.1311 | 1.6953 | 2.2274 | 2.4702 | 0.9204 | 9.4444 |
| Average feed rate, pound/hr | 0.0927 | 0.0904 | 0.0928 | 0.1074 | 0.1151 | 0.0976 |
| Pound 1,4-dihydronaphthalene/pound monomer | 0.00653 | 0.00591 | 0.00627 | 0.00738 | 0.00781 | 0.00664 |
| Solvent: | | | | | | |
| Pounds Isopar C fed | 3,530.38 | 3,179.10 | 3,752.54 | 3,631.79 | 1,191.08 | 15,284.89 |
| Average feed rate, pounds/hr | 153.49 | 169.55 | 156.36 | 157.90 | 148.89 | 157.98 |
| Total feed to reactors, pounds | 3,898.12 | 3,502.40 | 4,145.83 | 3,999.78 | 1,325.28 | 16,871.41 |
| Monomer feed, percent of total | 8.37 | 8.19 | 8.56 | 8.36 | 8.89 | 8.42 |

[1] Average.

At the end of each of the five days, the equipment was examined through a sight glass, and ports and clean out plugs in the transport line were removed and the lines examined for fouling or build-up of gel-like material. Only a very small amount of gel-like material was observed in each case. At the end of the five day period, the reactors weer completely drained and inspected, and there Accordingly, it is seen that in accordance with the instant invention, where small amounts of styrene are polymerized with butadiene, reactor-fouling with gel-like material is substantially reduced. Where the butadiene was polymerized without any styrene present, a gel-like material fouled the reactor and associated apparatus causing frequent shutdown to clean the fouled portions.

EXAMPLE 2

The procedure of Example 1 was essentially repeated with the exception that isoprene was employed in place of styrene.

Butadiene and isoprene, as a 10% solution in Isopar C, were fed into a polymerization reactor equipped with an agitator to provide a weight ratio of butadiene:isoprene within the range from about 95.3:4.7 to about 94.9:5.1. The reactor was run liquid full.

The alfin catalyst as used in Example 1 and 1,4-dihydronaphthalene were also added to the above mixture. The system was under an average pressure of about 2 p.s.i.g. and maintained at an average temperature of about 135° F. with moderate agitation. As the butadiene homopolymer is formed, the polymer is withdrawn continuously from the system.

Table III below sets out the pertinent data for a one week continuous operation as in Example 1.

TABLE III

|  | Starting materials at— | | | | | Total for week |
|---|---|---|---|---|---|---|
|  | Day 1 | Day 2 | Day 3 | Day 4 | Day 5 |  |
|  | Operating time (hours) | | | | | |
|  | 23.00 | 24.00 | 24.00 | 24.00 | 13.33 | 108.3₃ |
| Catalyst: | | | | | | |
| Pounds alfin catalyst fed | 124.89 | 128.51 | 123.08 | 130.32 | 66.97 | 573.77 |
| Average feed rate, pounds/hr | 5.43 | 5.35 | 5.13 | 5.43 | 5.02 | 5.30 |
| Pounds catalyst/pounds monomer | 0.3707 | 0.3661 | 0.3620 | 0.3809 | 0.3419 | 0.3664 |
| Monomers: | | | | | | |
| Pounds butadiene fed | 319.63 | 333.42 | 322.78 | 324.59 | 186.60 | 1,487.02 |
| Average feed rate, pounds/hr | 13.90 | 13.89 | 13.45 | 13.52 | 14.00 | 13.73 |
| Pounds isoprene fed | 17.26 | 17.57 | 17.25 | 17.57 | 9.26 | 78.91 |
| Average feed rate, pounds/hr | 0.75 | 0.73 | 0.72 | 0.73 | 0.69 | 0.73 |
| Total monomer fed, pounds | 336.89 | 350.99 | 340.03 | 342.16 | 195.86 | 1,565.93 |
| Average monomer feed rate, pounds/hr | 13.90 | 14.62 | 14.17 | 14.25 | 14.69 | 14.46 |
| Butadiene-isoprene ratio | 94.9/5.1 | 95.0/5.0 | 94.9/5.1 | 94.9/5.1 | 95.3/4.7 | ¹ 95.0/5.0 |
| Molecular weight moderator: | | | | | | |
| Pounds 1,4-dihydronaphthalene fed | 2.4221 | 2.6148 | 2.4221 | 2.3729 | 1.3562 | 11.1881 |
| Average feed rate, pounds/hr | 0.1053 | 0.1090 | 0.1009 | 0.0989 | 0.1017 | 0.1033 |
| Pounds 1,4-dihydronaphthalene/ pounds monomer | 0.00718 | 0.00744 | 0.00712 | 0.00693 | 0.00692 | 0.00714 |
| Solvent: | | | | | | |
| Pounds Isopar C fed | 3,445.73 | 3,589.86 | 3,643.64 | 3,607.55 | 2,035.20 | 16,321.98 |
| Average feed rate, pounds/hr | 149.81 | 149.58 | 151.82 | 150.31 | 152.68 | 150.67 |
| Total feed to reactors, pounds | 3,820.63 | 3,980.09 | 4,021.17 | 3,989.22 | 2,251.51 | 18,062.62 |
| Monomer feed, percent of total | 8.82 | 8.82 | 8.46 | 8.58 | 8.70 | 8.67 |

¹ Average.

At the end of each of the five days, the equipment was examined through a sight glass, and ports and clean out plugs in the transport lines were removed and the lines examined for fouling or build-up of gel-like material. Substantially no-gel-like material was observed in each of the five days. The polymer obtained in each case had substantially the same properties as butadiene homopolymer. The small amount of isoprene present had no significant effect.

EXAMPLE 3

Butadiene and isoprene, as a 4% solution in Isopar C, were fed into a polymerization reactor equipped with an agitator to provide a weight ratio of butadiene:isoprene within the range from about 98.0:2.0 to about 97.8:2.2. The reactor was run liquid full.

The alfin catalyst as used in Example 1 and 1,4-dihydronaphthalene were added to the above mixture. The system was under an average pressure of 2 p.s.i.g. and maintained at an average temperature of about 135° F. with moderate agitation. As the butadiene homopolymer is formed, the polymer is withdrawn continuously from the system.

Table IV below sets out the pertinent data for a one week continuous operation as in Example 1.

TABLE IV

|  | Starting materials at— | | | | | Total for week |
|---|---|---|---|---|---|---|
|  | Day 1 | Day 2 | Day 3 | Day 4 | Day 5 |  |
|  | Operating time (hours) | | | | | |
|  | 8.00 | 24.00 | 24.00 | 24.00 | 20.00 | 100.00 |
| Catalyst: | | | | | | |
| Pounds alfin catalyst fed | 61.54 | 128.51 | 124.89 | 126.70 | 108.60 | 550.24 |
| Average feed rate, pounds/hr | 7.69 | 5.35 | 5.20 | 5.28 | 5.43 | 5.50 |
| Pound catalyst/pound monomer | 0.5720 | 0.3845 | 0.3818 | 0.3747 | 0.4006 | 0.3993 |
| Monomers: | | | | | | |
| Pounds butadiene fed | 105.27 | 327.40 | 320.69 | 331.21 | 265.54 | 1,350.11 |
| Average feed rate, pounds/hr | 13.16 | 13.64 | 13.36 | 13.80 | 13.28 | 13.50 |
| Pounds isoprene fed | 2.31 | 6.81 | 6.42 | 6.94 | 5.52 | 28.00 |
| Average feed rate, pound/hr | 0.29 | 0.28 | 0.27 | 0.29 | 0.28 | 0.28 |
| Total monomer fed, pounds | 107.58 | 334.21 | 327.11 | 338.15 | 271.06 | 1,378.11 |
| Average monomer feed rate, pounds/hr | 13.45 | 13.92 | 13.63 | 14.09 | 13.56 | 13.78 |
| Butadiene-isoprene ratio | 97.8/2.2 | 98.0/2.0 | 98.0/2.0 | 97.9/2.1 | 97.9/2.1 | 98.0/2.0 |
| Molecular weight moderator: | | | | | | |
| Pound 1,4-dihydronaphthalene fed | 0.8231 | 2.4212 | 2.4221 | 2.6640 | 2.1792 | 10.5096 |
| Average feed rate, pound/hr | 0.1029 | 0.1009 | 0.1009 | 0.1110 | 0.1090 | 0.1051 |
| Pound 1,4-dihydronaphthalene/ pound monomer | 0.00765 | 0.00724 | 0.00740 | 0.00787 | 0.00803 | 0.00762 |
| Solvent: | | | | | | |
| Pounds Isopar C fed | 1,354.62 | 3,631.24 | 3,547.03 | 3,684.73 | 3,050.02 | 15,267.64 |
| Average feed rate, pounds/hr | 169.33 | 151.30 | 147.79 | 153.53 | 152.50 | 152.68 |
| Total feed to reactors, pounds | 1,480.56 | 4,004.50 | 3,912.15 | 4,061.65 | 3,354.21 | 16,813.07 |
| Monomer feed, percent of total | 7.27 | 8.35 | 8.36 | 8.33 | 8.08 | 8.20 |

At the end of each of the five days, the equipment was examined through a sight glass, and ports and clean out plugs in the transport lines were removed and the lines examined for fouling or build-up of gel-like material. The amount of gel-like material observed in each of the five days was substantially less than that observed where the butadiene was polymerized without the isoprene as in the control in Example 1. The polymer obtained had substantially the same properties as butadiene homopolymer. The small amount of isoprene present had no significant effect.

Accordingly, it is seen that in accordance with the instant invention, where the butadiene was polymerized with 2% isoprene, reactor fouling with gel-like material was substantially reduced over that obtained when polymerizing butadiene alone; and where the butadiene was polymerized with 5% isoprene, reactor fouling with gel-like material was substantially eliminated. When reference is made in this specification and claims to a "butadiene homopolymer" as a product prepared according to the improved process of this invention, it is recognized that the polymer product of this process may actually be a copolymer of butadiene and either isoprene or styrene; however, this product will contain such a minute amount of the isoprene or styrene, i.e. generally much less than about 5%, that the polymer product will be essentially a butadiene homopolymer, such that the properties of the polymer product will be substantially that of the butadiene homopolymer and practically measurably no different.

Having regard to the foregoing disclosure, the following is claimed as the inventive and patentable embodiments thereof:

1. A process for the continuous production of butadiene homopolymer from butadiene in a stirred reactor while suppressing a tendency of the butadiene polymerization reaction mixture to foul reactor and associated equipment by build-up of a gel-like substantially insoluble high molecular weight butadiene homopolymer gum, which comprises polymerizing butadiene with an alfin catalyst while continuously adding butadiene reactant feed and continuously withdrawing butadiene homopolymer reaction product and in the presence of an amount within the range from about 1% to about 5% by weight of isoprene sufficient to suppress fouling of the polymerization equipment by build-up of such gel-like material but insufficient to significantly affect the properties of the butadiene homopolymer, and continuing the polymerization in a continuous manner beyond the time when the equipment would have become fouled in the absence of the isoprene.

2. A process in accordance with claim 1 wherein the polymerization is carried out in the presence of a dihydroaromatic hydrocarbon molecular weight modifier.

3. A process in accordance with claim 2 wherein the dihydroaromatic hydrocarbon is 1,4-dihydronaphthalene.

4. A process in accordance with claim 1 wherein the polymerization of butadiene is carried out in the presence of an organic solvent.

5. A process in accordance with claim 1 wherein the alfin catalyst consists essentially of sodium isopropoxide, allyl sodium, and sodium chloride.

6. A process in accordance with claim 1 in which the alfin catalyst consists essentially of a sodium alkoxide, a sodium alkenyl compound, and an alkali metal halide, and including a dihydroaromatic hydrocarbon molecular weight modifier in the butadiene reaction mixture.

7. A process in accordance with claim 6 in which the catalyst consists essentially of sodium isopropoxide, allyl sodium, and sodium chloride; and 1,4-dihydronaphthalene is the molecular weight modifier.

References Cited

UNITED STATES PATENTS

| | | | |
|---|---|---|---|
| 2,559,947 | 7/1951 | Crouch | 260—83.7 |
| 2,801,234 | 7/1957 | Hanson | 260—94.7 |
| 3,067,187 | 12/1962 | Greenberg et al. | 260—94.2 |
| 3,177,183 | 4/1965 | Naylor et al. | 260—82.1 |
| 3,215,682 | 11/1965 | Farrar et al. | 260—94.3 |
| 3,223,691 | 12/1965 | Greenberg et al. | 260—93.5 |

OTHER REFERENCES

Hansley & Greenberg: "Manufacture of Alfin Rubber—Molecular Weight Control," Rubber Age 94 (1): 87–92 (October 1963).

JAMES A. SEIDLECK, Primary Examiner

U.S. Cl. X.R.

260—83.7, 94.2